Dec. 15, 1925.                      1,565,908
W. L. CONWELL
CAR LIGHTING SYSTEM
Filed Oct. 8, 1921          3 Sheets-Sheet 1

Walter L. Conwell INVENTOR
BY
Emery, Varney, Blair & Hoguet
ATTORNEYS

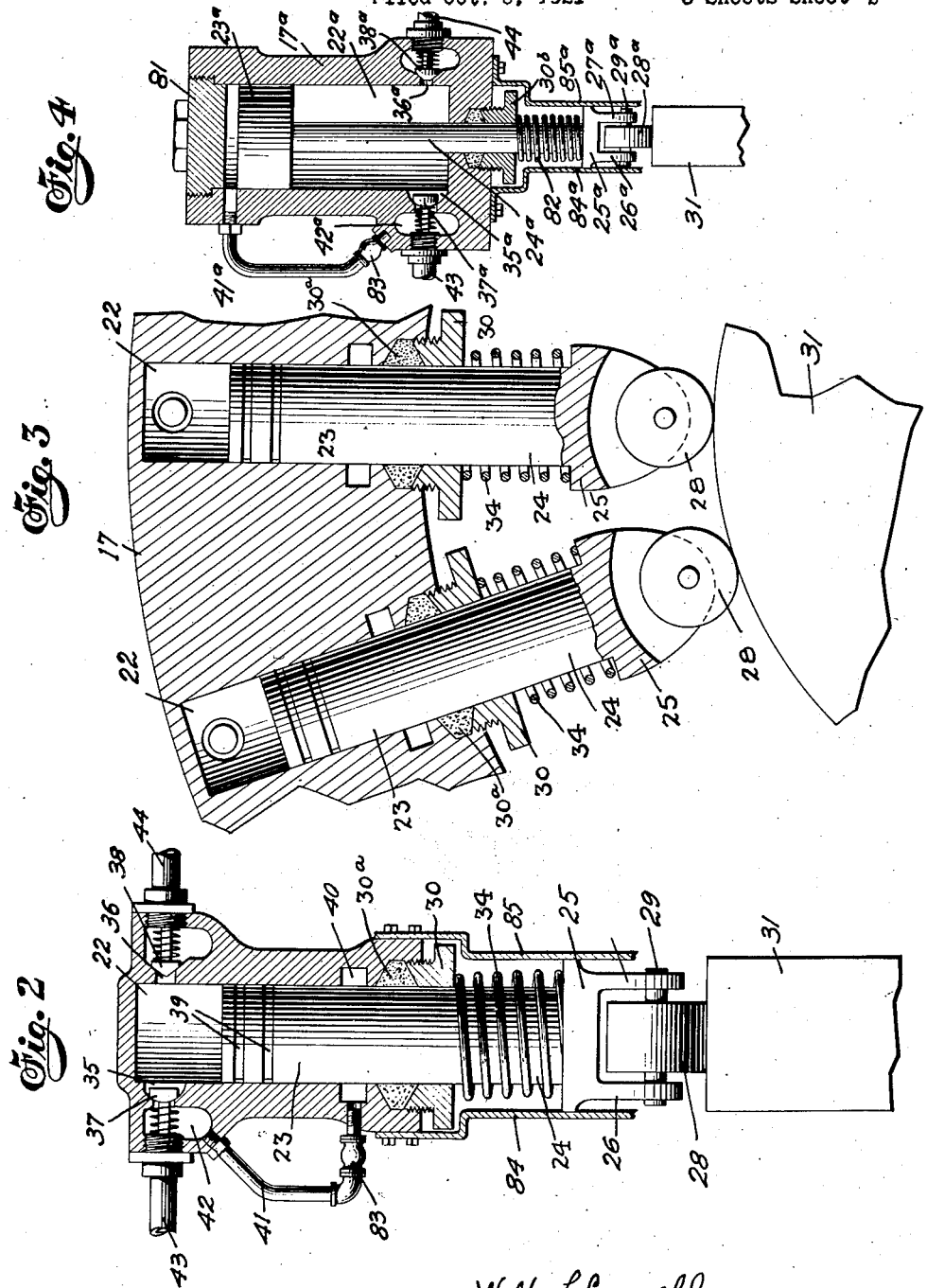

Dec. 15, 1925.  
W. L. CONWELL  
CAR LIGHTING SYSTEM  
Filed Oct. 8, 1921  
1,565,908  
3 Sheets-Sheet 3
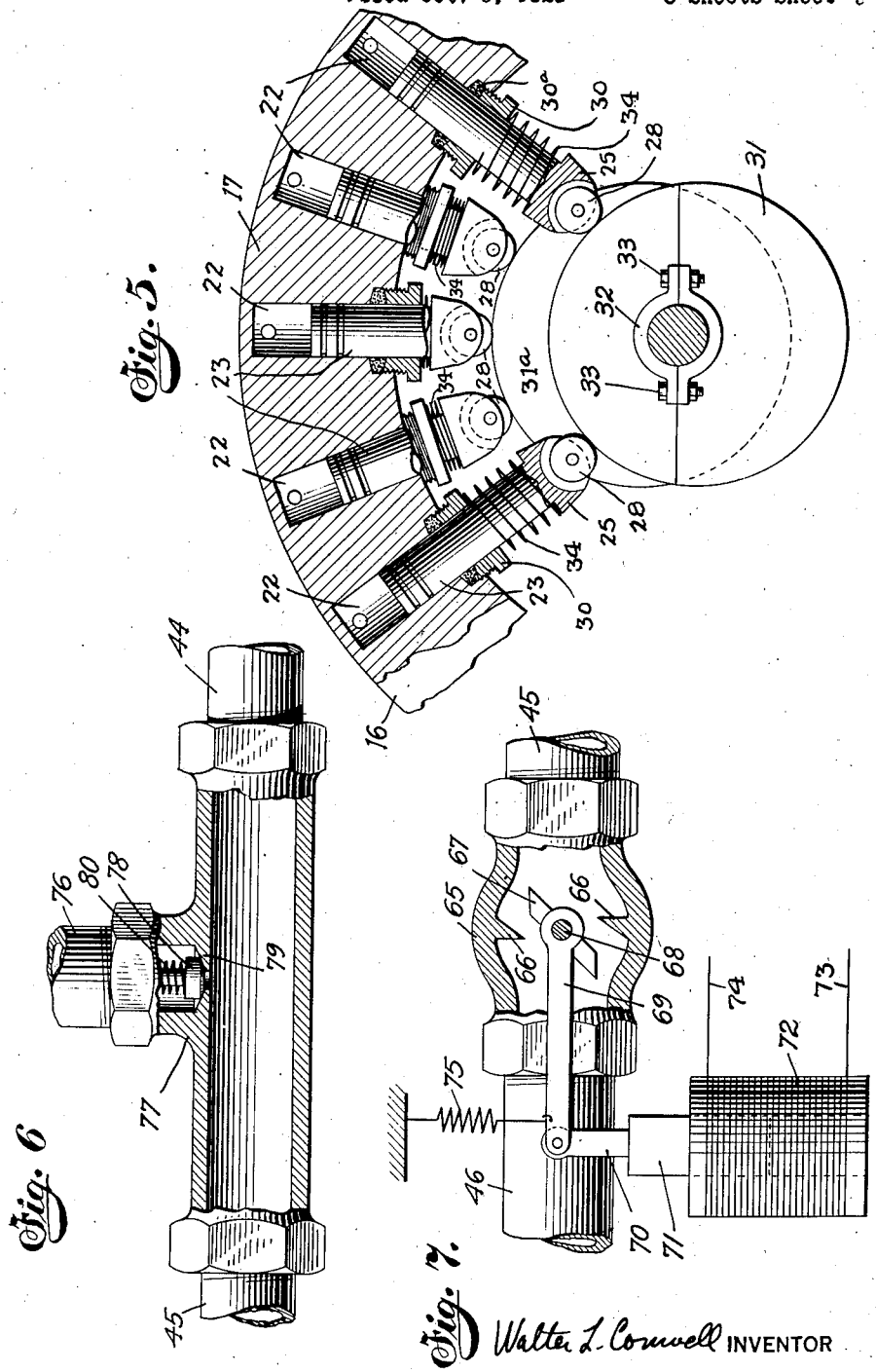

Patented Dec. 15, 1925.

1,565,908

UNITED STATES PATENT OFFICE.

WALTER L. CONWELL, OF MONTCLAIR, NEW JERSEY, ASSIGNOR TO THE SAFETY CAR HEATING & LIGHTING COMPANY, A CORPORATION OF NEW JERSEY.

CAR-LIGHTING SYSTEM.

Application filed October 8, 1921. Serial No. 506,268.

*To all whom it may concern:*

Be it known that I, WALTER L. CONWELL, a citizen of the United States, and a resident of Montclair, county of Essex, State of New Jersey, have invented an Improvement in Car-Lighting Systems, of which the following is a specification.

This invention relates to electric car lighting systems in which an electric generator is driven from a car axle, and more particularly this invention relates to apparatus for transmitting energy derived from the movement of the car or train to the generator.

An object of this invention is to provide a hydraulic power transmission apparatus for driving an electric generator from a car axle.

Another object is to provide apparatus of the above character that will be of practical and substantially inexpensive manufacture and in which the several parts thereof may be mounted upon or related to the various parts of a car or truck in a dependable and practical manner whereby accessibility to the several parts may be attained. This invention aims also to provide a transmission system of the above character in which the energy output of the generator may be regulated automatically and in an entirely reliable manner. Other objects will be in part obvious or in part pointed out hereinafter.

The invention accordingly consists in the features of construction, combinations of elements and arrangement of parts as will be exemplified in the structure to be hereinafter described and the scope of the application of which will be indicated in the following claims.

In the accompanying drawings in which is illustrated an embodiment of this invention and in which like reference characters refer to like parts throughout, Figure 1 is a plan view, partly diagrammatic, showing the several parts of the car lighting system of this invention in assembled relation with respect to the car axle;

Figure 2 is a transverse section on an enlarged scale through one of the pumping elements, and Figure 3 is a longitudinal sectional view on an enlarged scale through one of the pumping units and shows the relation of the several pumping elements of the unit to one another;

Figure 4 is a transverse sectional view on an enlarged scale showing a modified form of pumping element;

Figure 5 is a sectional view partly in elevation taken on the line 5—5 of Fig. 1 and shows the relation between the several pumping units to the car axle;

Figure 6 is an enlarged detail view, partly in section, of an automatic valve in the hydraulic system; and Figure 7 is a similar view of an electrically controlled regulating valve operated in the hydraulic system.

Figure 1:
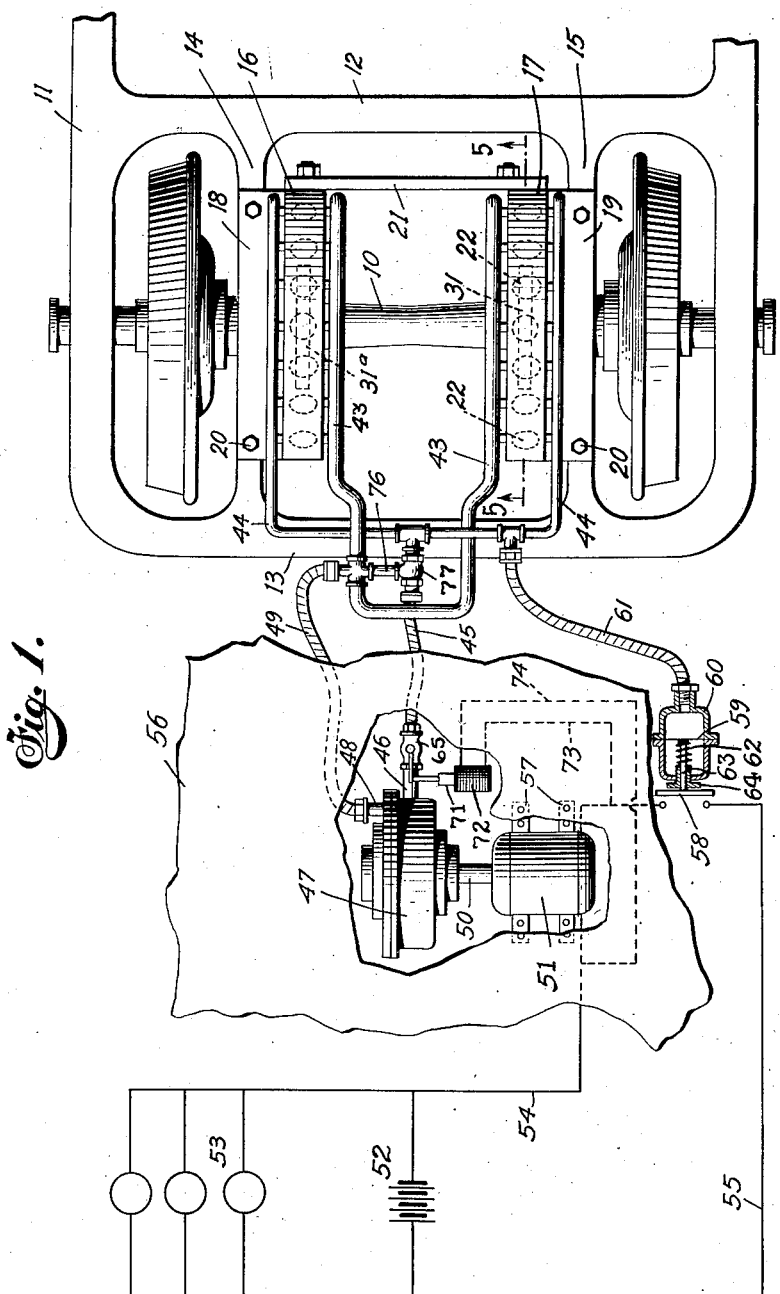

In Fig. 1 in the drawings, there is shown a car axle 10 with associated wheels adapted to assist in supporting any suitable form of truck frame 11. The truck frame 11 has preferably embodied in it suitable transversely extending members 12 and 13 across which are bridged the longitudinally extending struts 14 and 15. The pumping elements of the hydraulic system are preferably grouped to form two pumping units, supported respectively upon the struts 14 and 15. These units comprise the casings 16 and 17 having a general arcuate shape, as shown more clearly in Fig. 5, and are supported on the struts 14 and 15 by means of suitable supporting flanges 18 and 19 respectively which may be integrally formed with the casings 16 and 17. The supporting flanges 18 and 19 may be secured to the struts 14 and 15 respectively in any suitable manner, as by the bolts 20, for example, and are adapted to support the arcuate casings 16 and 17 in substantially concentric relation with respect to the axes of the car axle. Suitable tie-rods, indicated at 21, may be provided to assist in maintaining the two casings in proper relation to the car axle.

The arcuate casings 16 and 17 may be made in any convenient length, but, as will be seen from the ensuing description, they are preferably made of such extent as to include less than 180° between their extreme ends, thus to insure greater feasibility of construction and manufacture. The casings 16 and 17 are substantially identical in construction and hence the details of their construction, as well as the details of the construction of the individual pumping elements associated therewith, will be confined hereinafter to the description of only one of the casings with its respective pumping elements.

As indicated in Fig. 1, and as shown in the fragmentary sectional views in Figs. 3 and 5, the casing 17 is bored out to provide a plurality of radially extending cylinders 22 whose axes extend, as already noted, along respective radii of the arcuate casing 17 and since the latter is mounted concentrically with respect to the axis of the car axle 10, the axes of the respective cylinders will converge to a point substantially coincident with the axis of the axle 10.

Within each cylinder 22 there is mounted for reciprocation therein a plunger or piston 23 which is preferably extended downwardly to form a projecting operative portion 24 at the lower end of which there is formed or suitably secured thereto a yoke 25, the arms 26 and 27 of which form the supports for the roller 28 mounted for rotation upon the pin 29 extending through the arms 26 and 27. The upper end of the cylinder 22 is closed by a portion of the main casing 17 and the operative portion 24 of the piston 23 is packed with respect to the cylinder 22 by means of a suitable stuffing box, indicated at 30, a suitable packing material 30ª being provided to maintain the sliding connection fluid-tight. An eccentric 31, preferably formed in two halves as indicated in Fig. 5, is clamped upon the axle 10 by means of the split hub 32 and the clamping bolts 33. The eccentric 31 is positioned in the vertical plane of the several cylinders 22 of the casing 17 and is adapted to be contacted at its periphery by the rollers 28 of the several plungers 23. A spring 34 upon the lower operating portion 24 of the plunger 23 is interposed between the yoke portion 25 and the stuffing box member 30 and operates to urge the operating portion 24 with its plunger 23 in a downward direction so as to maintain the roller 28 in contact with the periphery of the eccentric 31. Thus, as the car axle 10 with its associated eccentric 31 is rotated, the plungers 23 in the casing 17 are successively and progressively reciprocated, and it will be noted that the several plungers are operated out of phase or out of step with one another.

Referring now to Fig. 2 of the drawings, it will be noted that the upper end of the cylinder 22 is provided with an intake port 35 and an outlet port 36 controlled, respectively, by the automatically operating valves 37 and 38. The plunger 23 may be packed at its upper end in any suitable manner, as indicated for example at 39, in order to reduce leakage past the plunger. In order, however, to take care of such leakage as may occur, there is provided at the lower portion of the cylinder 22 a counterbored or recessed section 40 which is connected by means of the pipe 41 to the inlet manifold indicated at 42. Thus, whatever leakage past the plunger 23 takes place, it is collected in the counterbored portion 40 and returned to the inlet or suction side of the pumping element.

Returning now to Figure 1 of the drawings, the respective inlet ports 35 controlled by the automatic valves 37 of the several pumping elements 22 are connected to a common conduit 43 which will hereinafter be termed the return conduit of the system. Similarly, the outlet or exhaust ports 36 controlled by the automatic valves 38 of the several pumping elements 22 are connected to a common conduit 44 which will be termed hereinafter the supply conduit. Furthermore, as indicated in Fig. 1, the respective elements of each pumping unit indicated by the casings 16 and 17 are similarly connected to the respective conduits above noted so that the pumping elements of the two units are fed with the fluid of the system from the common return conduit 43 and exhaust the fluid under pressure into the common supply conduit 44. As indicated clearly in Fig. 5, a second eccentric 31ª is mounted upon the car axle 10 in a similar manner as the eccentric 31 hereinbefore described, the eccentric 31ª being positioned in operative relation to the several pumping elements of the unit 16. The eccentric 31ª, however, is mounted upon the car axle 10 in opposite relation to the eccentric 31, that is, the two eccentrics are spaced 180° apart from one another. Thus, as more clearly seen in Fig. 5, as the eccentric 31 progressively operates upon the pumping elements of the unit 17 to permit the elements of the latter to make their return or suction strokes in progressive or out of phase relation to one another, the eccentric 31ª is operative upon the elements of the unit 16 to cause these elements to make their working or pumping strokes in progressive relation. In this manner the several pumping elements of both units are maintained out of phase with one another and substantially continuous, that is, non-pulsating pressure in the supply conduit 44 is maintained.

Turning now again to Fig. 1 of the drawings, the supply conduit 44 is connected through a flexible conduit 45 to the inlet 46 of a suitable hydraulic motor indicated at 47. The motor 47 may be of any suitable type and may, for example, take the form of a Pelton wheel. The outlet 48 of the motor 47 is connected through the flexible conduit 49 to the return conduit 43 associated with the pumping unit. To the shaft 50 of the motor 47 is connected a generator 51 preferably of the shunt-wound type which is adapted to supply a storage battery 52 and a lamp or work circuit 53 through the conductors 54 and 55. The motor 47 with its associated generator are preferably secured to the under side of the car frame indicated at 56 and adapted to be supported upon the truck frame 11, and may be secured thereto in any suitable manner, an indicated for example at 57.

The fluid employed and operated upon by the pumping units 16 and 17 is preferably a liquid such as a suitable oil, and as soon as the pressure in the supply conduit 44 has attained a sufficient value to operate the motor 47, and hence the generator 51, at the desired voltage a pressure operated switch 58 interposed in the conductor 55 is operated to connect the lamp and battery circuits to the generator. The switch 58 comprises a diaphragm 59 suitably mounted in a casing 60 one end of which is connected to the supply conduit 44 through a flexible coupling 61. The movement of the diaphragm 59 in response to the pressure exerted thereon by the fluid in the casing 60 is opposed by a spring 62 mounted upon the stem 63 connecting the switch 58 with the diaphragm 59. The spring 62 is interposed between the diaphragm 59 and a sleeve 64 concentric with the stem 63 and threaded into the other end of the casing 60. The pressure in the fluid supply system at which it is desired to have the generator connected to its circuit may thus be adjusted by means of the sleeve 63 through which the tension of the spring 62 may be varied. This pressure, as above noted, is that pressure at which the generator 51 will be operated by the motor 47 to produce a sufficient voltage at which the work circuit or storage battery may be supplied with current.

In the conduit 45 connecting the hydraulic motor 47 with the supply conduit 44 there is inserted a regulating valve for controlling the flow of fluid to the motor 47. This valve, which is more clearly shown in the enlarged view of Figure 7, comprises the casing 65 provided with the valve seat portions 66 with which a butterfly member 67 pivotally mounted upon the operating stem 68 cooperates. To the operating stem 68 is secured a lever 69 at one end of which there is connected through the link 70 the core 71 of a solenoid 72 connected through the conductors 73 and 74 (see Fig. 1) across the terminals of the generator 51. A spring 75 connected to one end of the lever 69 opposes the action of the solenoid 72 and its tension may be adjusted so that the solenoid 72 will respond to the voltage at which it is desired to regulate the output of the generator 51.

The solenoid 72 is preferably adjusted, as above described, to be responsive to a voltage corresponding substantially to the full charge voltage of the storage battery 52. Thus, as the pressure and velocity of the fluid supplied to the hydraulic motor 47 are increased in response to an increase in speed of the car axle 10, the resultant tendency to increase the speed of the hydraulic motor 47 and hence of the generator 51, cause a rise in the voltage of the generator above the value at which the solenoid 72 is adjusted to operate. The latter at once becomes effective to decrease the flow of fluid to the motor to maintain the speed of the latter at a value commensurate with the voltage at which the generator 51 is desired to be regulated. Vice versa, a decrease in the speed of the car axle 10 resulting in a decrease in the pressure and velocity of the fluid supplied to the motor 47 permits the solenoid 72 by a corresponding decrease in the voltage applied thereto to become effective to open the valve 67 to permit a greater flow of fluid to the motor 47. Thus, the requisite speed of the motor 47 commensurate with the desired voltage of the generator 51 is maintained throughout variations in the speed of rotation of the car axle 10.

The conduit 45 supplying fluid to the motor 47 is connected to the return conduit 43 of the hydraulic system through a conduit 76. The passage of fluid from the motor supply conduit 45 to the return conduit 43 is controlled by an automatic valve, more clearly shown in Fig. 6 of the drawings. This valve comprises a casing 77 to which the respective conduits above mentioned are connected, and the path of the fluid to the conduit 76 is controlled by means of a valve member 78 held upon its valve seat 79 by means of the spring 80 suitably mounted with respect to the valve member 78. As soon as the speed of the car axle 10, and hence the pressure and velocity of the fluid, increase, thus bringing about the throttling action of the valve member 67 in response to the solenoid 72, as hereinbefore described, the pressure in back of the valve member 67 and in the supply conduits will tend to increase because of the throttling action of the valve member 67, whereupon the increased pressure acting upon the automatic valve member 78 will raise the latter to permit the excess of fluid to pass to the return conduit 43 of the pumping system. Thus a proper flow of fluid to the motor is assured throughout the entire range of operating conditions and at the same time adequate protection against excessive pressures is afforded the entire pumping system.

It may also be noted that if the hydraulic motor 47 is of a direct-acting type, a sudden overload upon the generator would make a demand for an excessive pressure in the system at which the automatic valve member 78 may become operative to relieve the pumping system from the excessive overload and at the same time to relieve the generator, as well as its driving motor, from the excessive demands placed upon it. Such action is particularly advantageous in safeguarding the generator against such injury as may result from a short circuit, for example.

In Fig. 4 is illustrated a modified form of pumping element adapted to be incorporated in the pumping units 16 and 17. In this figure there is shown a casing 17$^a$ in which the individual pumping elements comprise a cylinder 22$^a$ closed at its lower end by a portion of the casing 17$^a$ and closed at its upper end by means of the cylinder cap 81 in threaded engagement with a counterbored portion of the cylinder 22$^a$. Within the cylinder 22$^a$ there operates a piston 23$^a$ operated by the piston rod 24$^a$ extending through the lower end of the casing 17$^a$, a stuffing box indicated at 30$^b$ being provided to make the sliding connection fluid tight. The elements 22 of the pumping units 16 and 17, hereinbefore described, make their working or pumping stroke in an upward direction, that is, in a direction away from the common center or from the axis of the car axle 10. In the modification shown in Fig. 4, the working stroke of the piston 23$^a$ takes place in a reverse direction, that is, during its movement toward the axis of the car axle 10. For this purpose the lower end of the cylinder 23$^a$ is provided with the inlet port 35$^a$ controlled by the automatic valve 37$^a$ and connected to the return conduit 43 as hereinbefore described and with an outlet port 36$^a$ controlled by the automatic valve 38$^a$ and connected to the supply conduit 44 which is in turn in connection with the hydraulic motor 47.

The piston rod 24$^a$ has mounted at its lower end the yoke 25$^a$. In the respective arms 26$^a$ and 27$^a$ there is mounted upon the pin 29$^a$ the roller 28$^a$ adapted to contact with and to be operated by the eccentric indicated at 31. A heavy spring 82 surrounds the piston rod 24$^a$ and is interposed between the stuffing box member 30$^b$ and the yoke 25$^a$. As the eccentric 31 operates upon the piston rod 24$^a$, the latter is moved in an outward direction and completes its suction stroke. As shown in Fig. 4, the piston 23$^a$ is shown at substantially the end of its suction stroke and ready to begin its pumping stroke.

During the action of the eccentric 31 just described, the eccentric 31 stores energy in the spring 82 so that as the rotation of the eccentric 31 continues, the piston 23$^a$ begins its pumping stroke by reason of the expenditure of the energy thus stored in the spring 82. The latter is made of such strength that it can be effective to operate the piston 23$^a$ against any back pressure in the hydraulic system up to a predetermined maximum value. This value is preferably equivalent to that pressure at which the hydraulic motor 47 will operate at the desired speed and output and may be so chosen that the pressure output of the pumping units is substantially constant. Thus, as the speed of rotation of the car axle 10 increases, the resultant increase in speed of operation of the several pumping elements of the type illustrated in Fig. 4 would tend to increase the pressure in the supply conduit 44. As such pressure increases however, the spring 82 operating each piston 23$^a$ becomes less effective and operates the piston throughout a smaller extent of its pumping stroke. Vice versa, a decrease in the speed of the car axle 10 tends to bring about a decrease in the pressure in the hydraulic system, whereupon the spring 82 operating each piston 23 of the several pumping elements is effective to operate its associated piston throughout a greater extend of its pumping stroke to maintain the pressure and velocity of the fluid in the supply conduits substantially constant.

Thus a substantially constant pressure and velocity in the fluid of the transmission system is maintained and the pumping units are made substantially self-protective against excessive pressures due to excessive speeds of operation. The automatic valve 77 may thus be made to function simply as a safety valve, as hereinbefore described, or may even be entirely dispensed with and the throttling valve controlled by the electrical output of the generator becomes more sensitive and more positive in its action since it is called upon to operate against conditions which are less varying or fluctuating than would otherwise be the case.

In connection with the modified form just described and shown in Fig. 4, it may be noted that leakage past the piston is returned to the intake manifold indicated at 42$^a$ through the conduit 41$^a$ connecting the head end of the cylinder 22$^a$. A suitable check valve indicated at 83 is inserted in the conduit 41ª to prevent the passage to the head end of the cylinder of fluid from the intake manifold 42ª.

While in the foregoing description of the pumping units it has been stated that the arcuate casings 16 and 17 in which the radially extending pumping elements operate are mounted with respect to the axis so that the common center coincides substantially with the axis of the axle 10, it will be understood that the cylinders comprising the various elements are of such length with respect to the strokes of the pistons or plungers operating therein that an appreciable clearance is left between the plunger and the head end of the cylinder. Thus relative movement between the truck frame 11, which carries the units 16 and 17, with respect to the car axle 10 may take place without affecting the operation of the several pumping elements. Such movement will affect merely the amount of clearance above mentioned as the several units are moved toward or away from the car axle 10 due to variations in load on the truck frame 11.

Similarly, it may be noted that the faces of the eccentrics 31 and 31ª are of sufficient width to maintain the rollers 28 in operative relation thereto during whatever relative movement in a lateral direction between the truck frame 11 and the car axle 10 may take place.

In order to prevent rotation of the plungers 23 about their respective axes, and therefore in order to maintain the rollers 28 associated with each plunger in proper rolling contact with the eccentrics, the yoke portion 25 of each plunger is preferably squared off so that its lateral and parallel faces may, during the reciprocation of the plunger, contact with the guiding plates 84 and 85, each positioned on one side of the plunger and suitably secured to the casing 17 as indicated in Fig. 2. The plates 84 and 85 are arcuate in shape and are of sufficient extent to act as guides for all of the plungers associated with a single unit. Furthermore, they are a sufficient depth in the direction of the axis of the plungers so that they act as guides throughout the entire stroke of the several plungers. A similar construction comprising the plates 84ª and 85ª suitably secured to the casing 17ª is employed to prevent rotation of the piston rod 24ª and its associated operating roller 28ª in the modified form shown in Fig. 4.

It will thus be seen that there has been provided in this invention a hydraulic system for transmitting energy from the car axle to an electric generator in which the several objects of this invention, as well as many advantages, are successfully achieved. It may further be noted that there has been provided apparatus of the above nature which may be readily mounted in operative relation to the car axle and which may be operated therefrom in an exceedingly simple and practical manner. The several parts of the apparatus are readily accessible and it may be added also that accessibility to the several parts of the car frame or truck is not impaired.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In apparatus of the general nature of that herein described, in combination, a car axle, an electric generator, a fluid motor for driving said electric generator, a fluid pump associated with said car axle and including a cylinder and a piston operating therein adapted to drive said fluid motor, a cam mounted upon said car axle adapted to move said piston throughout its suction stroke, and means associated with said piston for storing a predetermined amount of energy from said cam during its operation of said piston throughout its suction stroke and adapted to operate said piston during its pumping stroke, whereby the pressure of the fluid supplied to said motor is maintained substantially constant.

2. In apparatus of the general nature of that herein described, in combination, a car axle, an electric generator, a fluid motor for driving said generator, a pumping unit mounted adjacent said car axle and comprising a plurality of cylinders with their associated pistons, a cam mounted upon said car axle for moving said pistons throughout their suction strokes in out-of-phase relation with respect to one another, means associated with each piston adapted to receive a predetermined amount of energy from said cam during the operation thereby of each piston, whereby each piston is moved during its pumping stroke by the expenditure of said predetermined amount of energy in said means associated with each piston, and means connecting the output of each cylinder with said fluid motor, whereby said motor is supplied from said plurality of pistons by fluid at substantially constant pressure.

3. In apparatus of the general nature of that herein described, in combination, a car axle, an electric generator, a fluid motor for driving said generator, a fluid pump driven from said car axle and adapted to drive said fluid motor, means associated with said pump for maintaining the pressure of its output substantially constant irrespective of the speed of operation of said pump by said car axle, and means adapted to regulate said fluid motor in accordance with a function of the output of said generator.

4. In apparatus of the general nature of that herein described, in combination, a car axle, an electric generator, a fluid motor for driving said generator, a fluid pump mounted adjacent said car axle and adapted to drive said fluid motor, means for receiving a predetermined amount of energy associated with said fluid pump, a cam mounted on said car axle for storing energy in said means, whereby said fluid pump is operated by the expenditure of said predetermined amount of energy and whereby said fluid motor is supplied with fluid at substantially constant pressure irrespective of the speed of said car axle, and means adapted to regulate said motor in accordance with the voltage of said generator to maintain the same substantially constant.

In testimony whereof, I have signed my name to this specification this 27th day of September, 1921.

WALTER L. CONWELL.